(12) United States Patent
Kawauchi et al.

(10) Patent No.: US 11,002,561 B2
(45) Date of Patent: May 11, 2021

(54) GAS METER MANAGEMENT SYSTEM

(71) Applicant: Panasonic Intellectual Property Management Co., Ltd., Osaka (JP)

(72) Inventors: Akiyoshi Kawauchi, Nara (JP); Yoshikuni Tamura, Osaka (JP); Nobuaki Murabayashi, Osaka (JP); Tadanori Shirasawa, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/617,465

(22) PCT Filed: Jun. 22, 2018

(86) PCT No.: PCT/JP2018/023798
§ 371 (c)(1),
(2) Date: Nov. 26, 2019

(87) PCT Pub. No.: WO2019/004079
PCT Pub. Date: Jan. 3, 2019

(65) Prior Publication Data
US 2020/0182654 A1 Jun. 11, 2020

(30) Foreign Application Priority Data
Jun. 30, 2017 (JP) .............................. JP2017-128359

(51) Int. Cl.
*G01D 4/00* (2006.01)
*G01D 3/036* (2006.01)
(Continued)

(52) U.S. Cl.
CPC ........... *G01D 4/004* (2013.01); *G01D 3/0365* (2013.01); *G08B 21/16* (2013.01); *G08B 23/00* (2013.01);
(Continued)

(58) Field of Classification Search
CPC ...... G01D 4/004; G01D 3/0365; G08B 21/16; G08B 23/00; H04Q 2209/00;
(Continued)

(56) References Cited

U.S. PATENT DOCUMENTS 6,778,100 B2 * 8/2004 Schempf .................. F17D 3/01
340/870.07
7,013,240 B2 * 3/2006 Malik ..................... G01F 1/667
702/183

(Continued)

FOREIGN PATENT DOCUMENTS

JP     8-005448     1/1996
JP    11-167692     6/1999
(Continued)

OTHER PUBLICATIONS

International Search Report of PCT application No. PCT/JP2018/023798 dated Sep. 25, 2018.
(Continued)

*Primary Examiner* — Franklin D Balseca
(74) *Attorney, Agent, or Firm* — Wenderoth, Lind & Ponack, L.L.P.

(57) ABSTRACT

Gas meter and center device are included. Gas meter is installed in a residence or the like of each customer, and includes flow rate measurer. Center device collects information obtained by gas meter. In addition, center device manages positional information indicating a position of gas meter, and displays information including a result of analyzing information obtained from gas meter, together with the position of gas meter on a map. By employing this configuration, the information obtained from gas meter is collected by center device, and information based on collected data is displayed on a map on which gas meter is positioned. This enables the information obtained from gas meter to be visually reported.

9 Claims, 4 Drawing Sheets

(51) Int. Cl.
  *G08B 21/16* (2006.01)
  *G08B 23/00* (2006.01)
  *H04Q 9/00* (2006.01)

(52) U.S. Cl.
  CPC .......... *H04Q 9/00* (2013.01); *H04Q 2209/10* (2013.01); *H04Q 2209/60* (2013.01); *H04Q 2209/84* (2013.01)

(58) Field of Classification Search
  CPC .......... H04Q 2209/10; H04Q 2209/40; H04Q 2209/60; H04Q 2209/70; H04Q 2209/84; H04Q 9/00
  See application file for complete search history.

(56) References Cited

U.S. PATENT DOCUMENTS

| | | | | |
|---|---|---|---|---|
| 8,477,830 | B2 * | 7/2013 | Myers | H04B 1/7103 |
| | | | | 375/150 |
| 9,194,899 | B2 * | 11/2015 | Zoldi | G01D 4/004 |
| 9,441,987 | B2 * | 9/2016 | Cornwall | F17D 3/01 |
| 9,528,624 | B2 * | 12/2016 | Naganuma | G01F 15/005 |
| 10,533,965 | B2 * | 1/2020 | Wang | G01N 27/4075 |
| 2006/0022841 | A1 | 2/2006 | Hoiness et al. | |
| 2007/0183369 | A1 * | 8/2007 | Angelis | G06Q 50/06 |
| | | | | 370/332 |
| 2015/0276954 | A1 | 10/2015 | Yokoyama et al. | |

FOREIGN PATENT DOCUMENTS

| | | | | |
|---|---|---|---|---|
| JP | 2000-285338 | | 10/2000 | |
| JP | 2000285338 | A * | 10/2000 | .............. G08B 23/00 |
| JP | 2001-283365 | | 10/2001 | |
| JP | 2002-288762 | | 10/2002 | |
| JP | 2002-291068 | | 10/2002 | |
| JP | 2005-182365 | | 7/2005 | |
| JP | 2014-207496 | | 10/2014 | |
| JP | 2015-201189 | | 11/2015 | |

OTHER PUBLICATIONS

Extended European Search Report dated May 26, 2020 in corresponding European Patent Application No. 18824715.9.

* cited by examiner

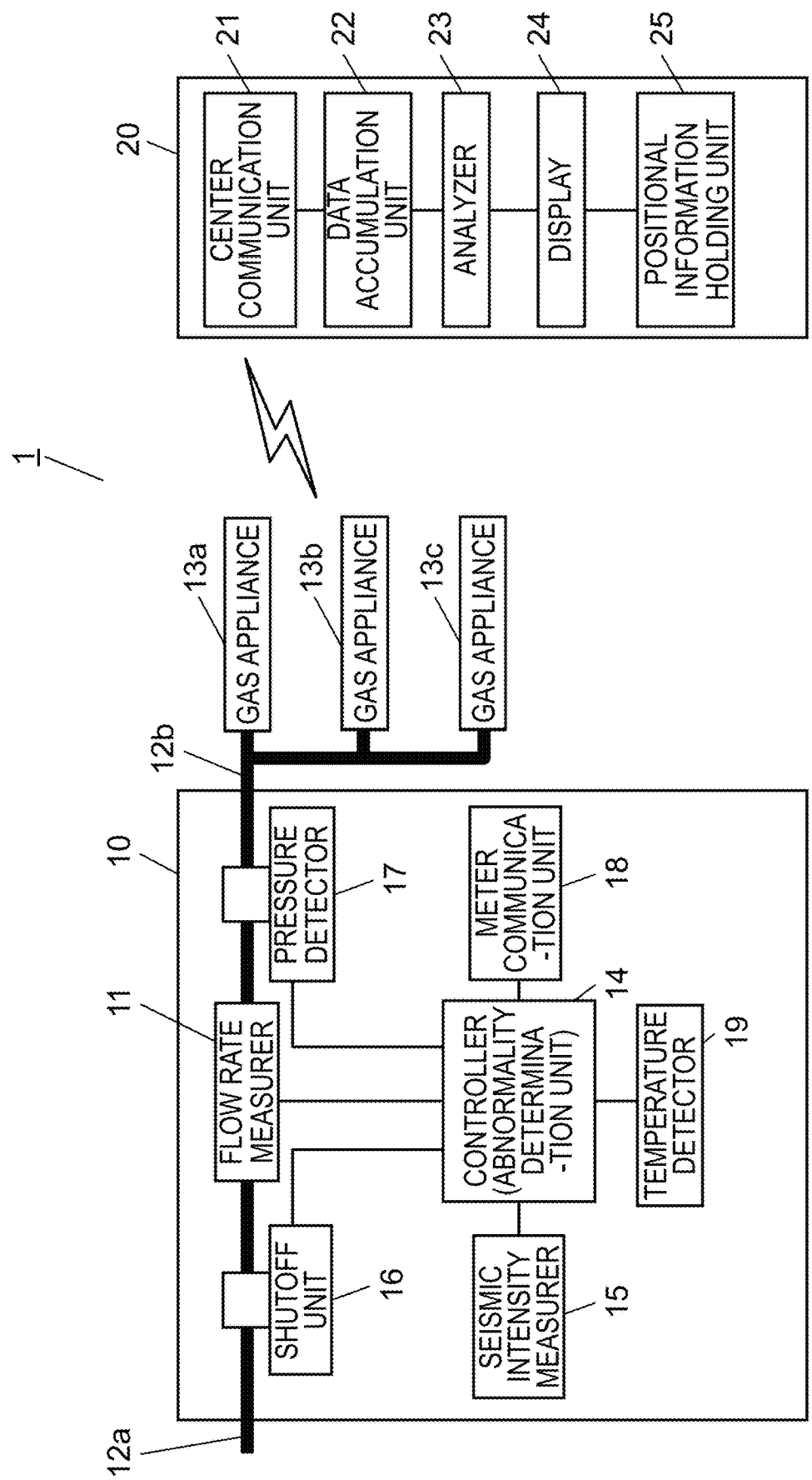

GAS METER MANAGEMENT SYSTEM

TECHNICAL FIELD

The present invention relates to a gas meter management system that manages information obtained from a gas meter that measures a flow rate of gas, by using a center device.

BACKGROUND ART

Conventionally, as this type of system, a system has been provided that includes a gas meter incorporating an abnormality detector, and a server computer that configures an automatic meter reading system. The system collects abnormality information, such as gas leakage or a reduction in pressure, that has been detected by the gas meter, by using the server computer, displays the abnormality information as alarm information on a map, and makes an attempt to quickly perform a recovery operation or the like (see, for example, PTL 1).

CITATION LIST

Patent Literature

PTL 1: Unexamined Japanese Patent Publication No. 2002-288762

SUMMARY OF THE INVENTION

However, in a conventional configuration, an attempt is made to quickly take action against an emergency abnormality such as gas leakage or a reduction in pressure, and a principal purpose is to specify a region in which an abnormality has occurred, and is not to monitor a state of a gas meter itself in each residence.

The present invention provides a gas meter management system that is capable of visually reporting information obtained from a gas meter, by collecting various types of information obtained from the gas meter by using a center device, and displaying information based on collected data on a map on which the gas meter is positioned.

A gas meter management system according to the present invention includes a gas meter and a center device. The gas meter is installed in a residence or the like of each customer, and includes a flow rate measurer. The center device collects information obtained by the gas meter. The center device manages positional information indicating a position of the gas meter, and displays the information together with the position of the gas meter on a map.

By employing this configuration, various types of information obtained from a gas meter are collected by using a center device, and information based on collected data is displayed on a map on which the gas meter is positioned. This enables information obtained from the gas meter to be visually reported.

BRIEF DESCRIPTION OF DRAWINGS

FIG. 1 is a block diagram of a gas meter management system according to a first exemplary embodiment of the present invention.

DESCRIPTION OF EMBODIMENTS

Figure 2A:
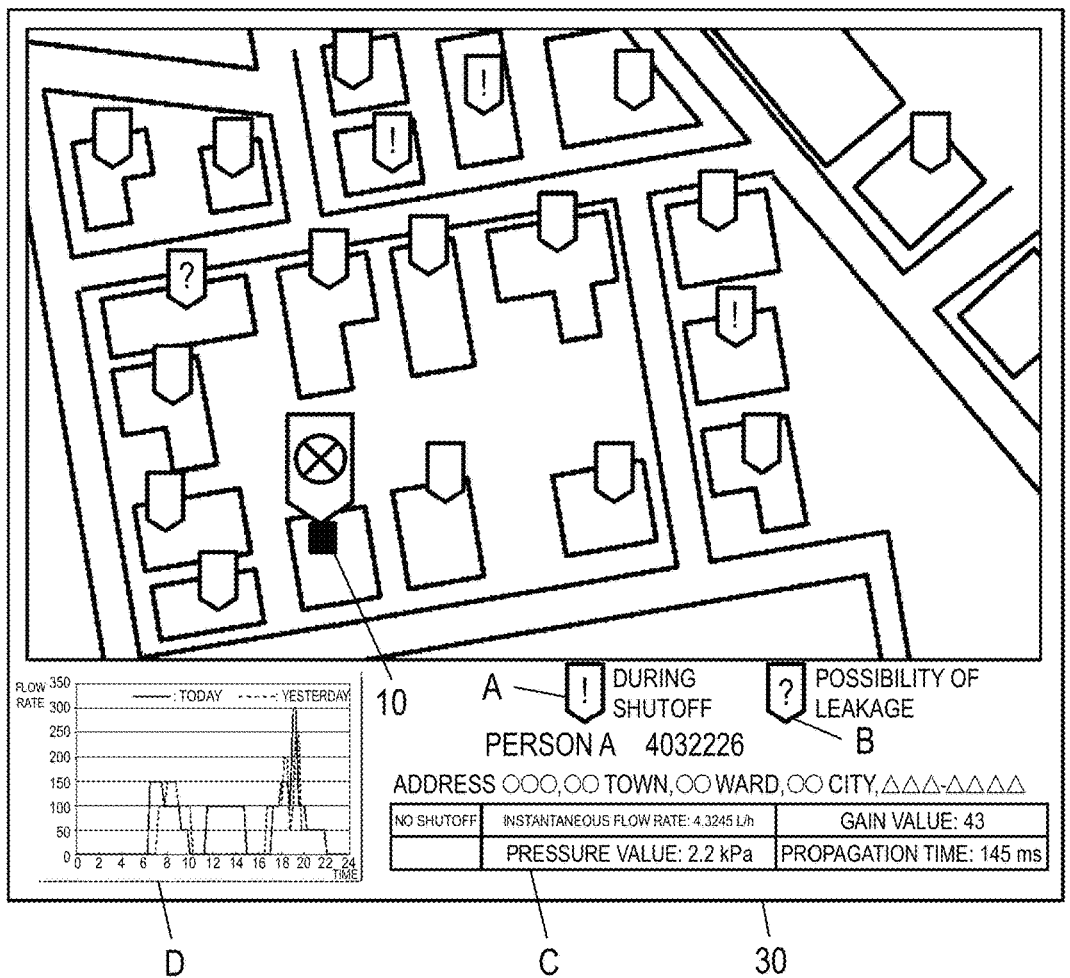
FIG. 2A is a diagram for explaining display content of the gas meter management system according to the first exemplary embodiment of the present invention.

Exemplary embodiments of the present invention are described below with reference to the drawings. It is to be noted that the present invention is not limited to these exemplary embodiments.

First Exemplary Embodiment

FIG. 1 is a block diagram of a gas meter management system according to a first exemplary embodiment of the present invention.

In FIG. 1, gas meter management system 1 includes gas meter 10 that has been installed in a user's residence, and center device 20. Gas meter 10 is installed in a residence of each user, and there is a plurality of gas meters 10. However, in the present exemplary embodiment, description is provided by using only one gas meter 10.

Gas meter 10 includes inflow pipe 12a and outflow pipe 12b of gas, and flow rate measurer 11 is provided on a route from inflow pipe 12a to outflow pipe 12b. In addition, a plurality of gas appliances 13a, 13b, 13c is connected on a downstream side of outflow pipe 12b.

Flow rate measurer 11 detects and outputs a flow rate of gas in time series, and measures an instantaneous flow rate at predetermined intervals (for example, every 0.5 seconds). Controller 14 integrates a gas consumption amount based on flow rate data measured by flow rate measurer 11. Alternatively, controller 14 obtains seismic intensity information from seismic intensity measurer 15, and in a case where it has been determined that a seismic intensity of an earthquake is greater than or equal to a predetermined seismic intensity, controller 14 causes shutoff unit 16 to shut off gas. Further, controller 14 has a function of, for example, obtaining a pressure value from pressure detector 17 and determining an abnormality of a reduction in pressure.

Meter communication unit 18 obtains, from controller 14, an integrated value of a gas consumption amount that has been obtained by controller 14 or measurement conditions or the like of flow rate measurer 11, and transmits the integrated value or the measurement conditions or the like to center device 20. Here, for example, in a measurement method in which flow rate measurer 11 uses ultrasonic waves, the measurement conditions or the like of flow rate measurer 11 include an amplification factor (a gain of an amplifier circuit) at which received waves are amplified, a propagation time of ultrasonic waves, or the like, and mean data that enables verification of the presence or absence of an abnormality in a measurement system. Therefore, the measurement conditions or the like of flow rate measurer 11 are not limited to the gain of the amplifier circuit or the propagation time.

Further, meter communication unit 18 also transmits, to center device 20, a type of an abnormality determined by controller 14, the pressure value obtained from pressure detector 17, a seismic intensity obtained by seismic intensity measurer 15, and an ambient temperature of a gas meter or a temperature of gas that has been obtained by temperature detector 19, as information obtained by gas meter 10.

On the other hand, center device 20 includes center communication unit 21, data accumulation unit 22, analyzer 23, and display 24. Center communication unit 21 performs communication with meter communication unit 18 of gas meter 10. Data accumulation unit 22 accumulates received flow rate data. Analyzer 23 performs analysis by using the flow rate data accumulated in data accumulation unit 22. Display 24 displays information obtained in analysis performed by analyzer 23 together with a position on a map of gas meter 10. Positional information of gas meter 10 is stored in positional information holding unit 25 together with latitude and longitude of a location where gas meter 10 has been installed and a user's name and address.

FIG. 2A illustrates an example of a screen displayed by display 24. Here, a shape and a position of a residence are displayed on map 30, and the presence or absence of abnormality is visually displayed based on information obtained by a gas meter installed in each of the residences, by using "during shutoff of gas" (indication A in the drawing), "possibility of leakage" (indication B in the drawing), or the like.

Figure 2B:
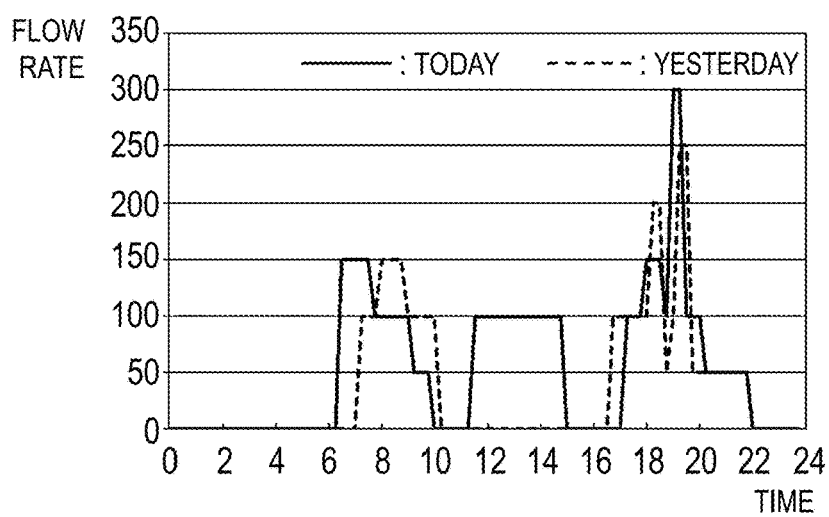
FIG. 2B is an enlarged view of graph D of FIG. 2A.

In addition, as measurement conditions of a specified gas meter, measurement conditions (a gain and a propagation time) of gas meter 10 installed in Person M's residence and gas pressure are displayed here together with an address (indication C in the drawing). Further, a change in a flow rate of gas of gas meter 10 for current 48 hours is displayed as graph D (an enlarged view of graph D is illustrated in FIG. 2B). In graph D indicating a change in a flow rate of gas of gas meter 10, a solid line indicates a change in a flow rate of gas of today, and a dotted line indicates a change in a flow rate of gas of yesterday.

Here, a display of an individual gas meter can be arbitrarily selected and conducted. An administrator of center device 20 can select a gas meter in which an abnormality has occurred so as to confirm details of information obtained from the gas meter, can estimate a cause of the abnormality, and can quickly take action against the abnormality.

Figure 3:
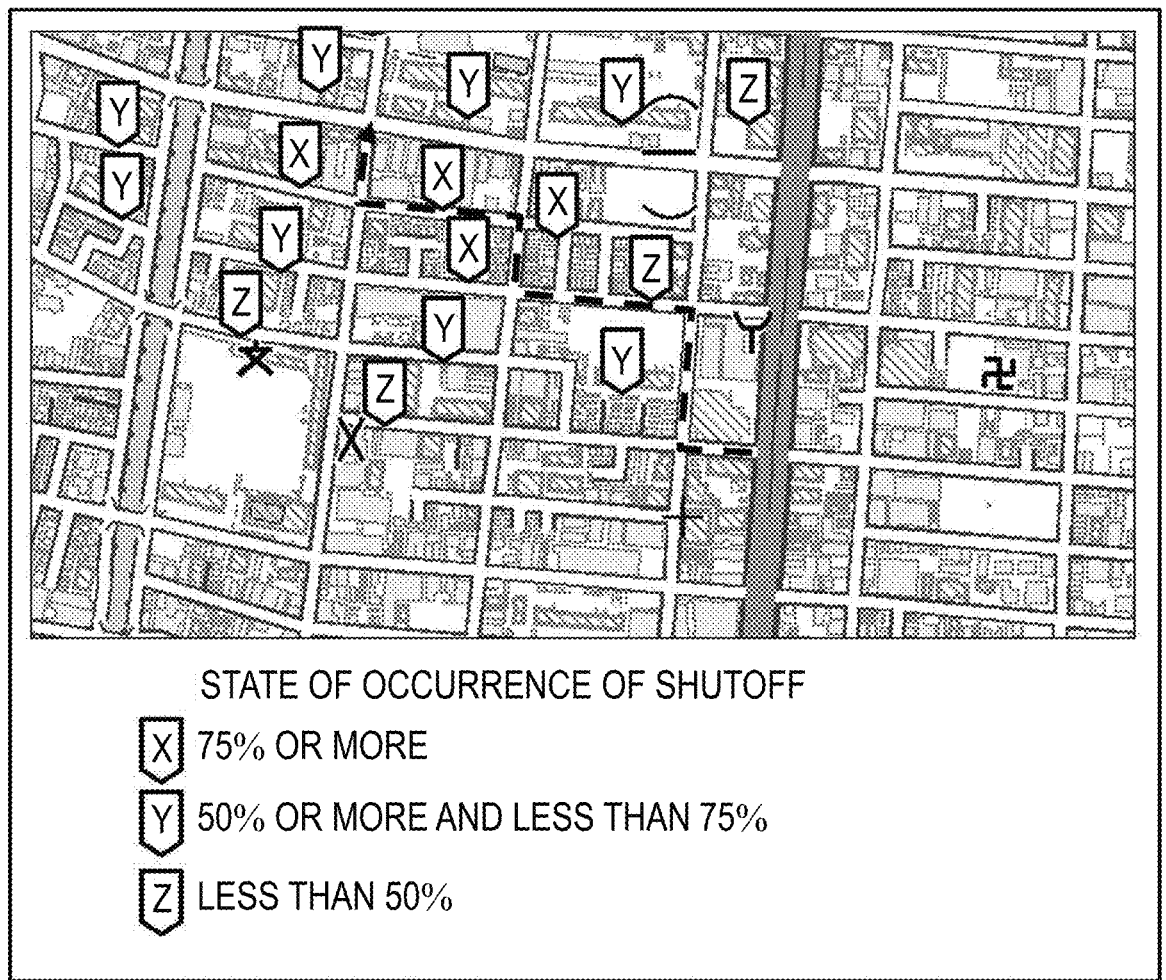
FIG. 3 is a diagram for explaining display content in another example of the gas meter management system according to the first exemplary embodiment of the present invention.

FIG. 3 illustrates a map including a wider area than an area of a map illustrated in FIG. 2A. A shutoff state in a district sectioned by roads is displayed based on shutoff information obtained by a plurality of gas meters in the district. For example, indication X in the drawing indicates "shutoff at a ratio that is greater than or equal to 75%", and indication Y indicates "shutoff at a ratio that is greater than or equal to 50% and is less than 75%". In addition, indication Z indicates "the occurrence of shutoff at a ratio that is less than 50%", and non-indication indicates "no shutoff".

Accordingly, an administrator of center device 20 can determine a district that has a higher priority of a recovery operation from a state of the occurrence of shutoff that has been displayed on the map, and can consider an optimal route through which the recovery operation will be performed. In the present exemplary embodiment, as indicated on the map of FIG. 3, the optimal route is automatically extracted by center device 20, and is indicated with a dotted line. In addition, whether recovery has been completed can be confirmed on this map, and a progress of the recovery operation can also be grasped.

Further, a distribution of a magnitude of seismic intensity that has been obtained by each of the meters can be similarly displayed instead of the shutoff information. In this case, it is possible, for example, to predict the occurrence of a crack in a pipe, or the like even when shutoff has not occurred.

Second Exemplary Embodiment

In a second exemplary embodiment of the present invention, a configuration of gas meter management system is the same as a configuration according to the first exemplary embodiment. Center device 20 determines an abnormality in gas meter 10 or an abnormality in gas supply in a region based on measurement conditions (a gain or a propagation time) or gas pressure that has been obtained from gas meter 10.

Figure 4A:
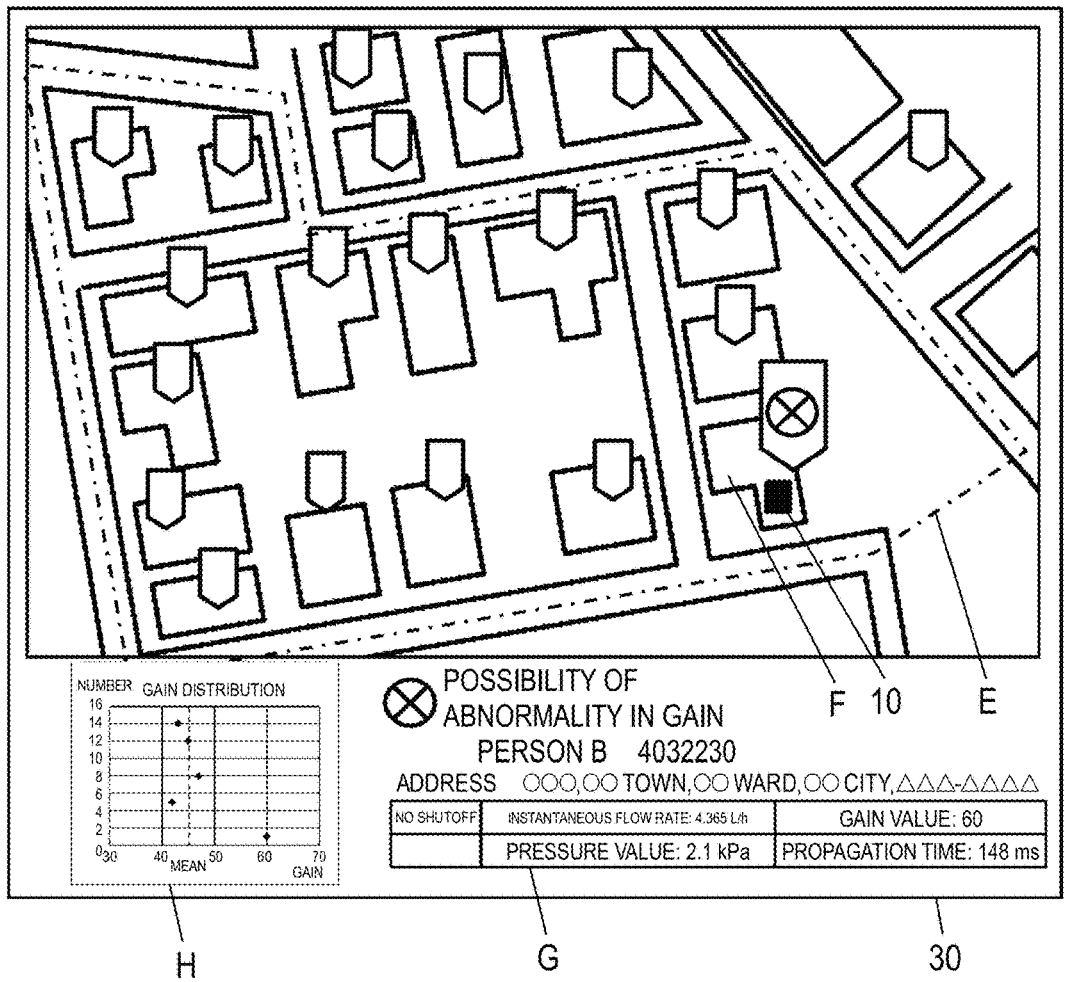
FIG. 4A is a diagram for explaining display content of a gas meter management system according to a second exemplary embodiment of the present invention.
Figure 4B:
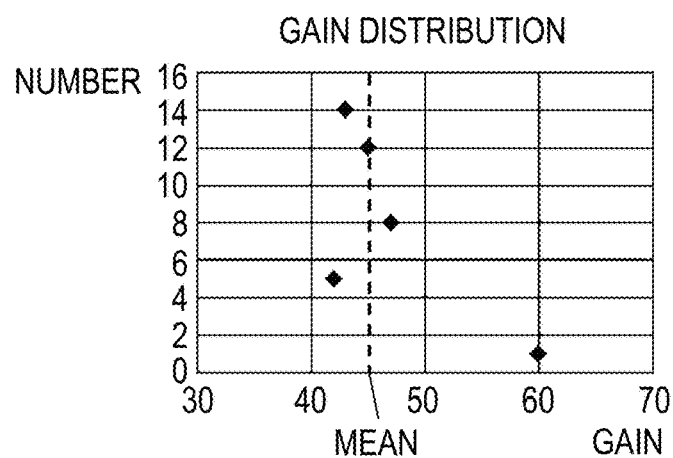
FIG. 4B is an enlarged view of graph H of FIG. 4A.

For example, FIG. 4A illustrates an example of display content according to the second exemplary embodiment. Center device 20 analyzes a distribution state of a gain of measurement conditions obtained from a plurality of gas meters installed in a region using a common gas pipe (region E indicated with an alternating long and short dashed line), and center device 20 determines that a gas meter that is performing measurement at a gain that is considered to be abnormal has an abnormality in a gain. Then, center device 20 displays a position of position F of this gas meter, and displays an address and a name of Person N who is a user, and measurement conditions G of this gas meter, or a gain distribution state as graph H (an enlarged view of graph H is illustrated in FIG. 4B).

Normally, measurement conditions are almost the same in gas meters connected to the same gas pipe. Therefore, in a case where a gain of a certain gas meter is significantly different from gains of the other gas meters, there is a high probability of the occurrence of some kind of abnormality in flow rate measurer 11 of the certain gas meter. Here, attention has been paid to the gain. However, by determining an abnormality in consideration of a pressure value, a propagation time, or the like, an accuracy of determination is improved.

In the present exemplary embodiment, gains have been compared with each other from the viewpoint of a distribution of a simple number of gains. However, by using a statistical method such as standard deviation, a failure can be predicted, and an abnormality can also be early discovered.

In addition, by similarly analyzing a gas pressure distribution, an abnormality in a pressure detector of a gas meter can also be determined.

Further, by analyzing a gas pressure distribution obtained from gas meters in combination with positional information on a map, an abnormality on a pipe of gas can also be determined.

As describe above, a gas meter management system in first disclosure includes a gas meter and a center device. The gas meter is installed in a residence of each customer, and includes a flow rate measurer. The center device collects information obtained by the gas meter. The center device manages positional information indicating a position of the gas meter, and displays the information together with the position of the gas meter on a map.

By employing this configuration, various types of information obtained from the gas meter are collected by the center device, and information based on collected data is displayed on a map on which the gas meter is positioned. This enables information obtained from the gas meter to be visually reported.

Gas meter management system 1 in second disclosure may have a configuration in which, in particular, in the first disclosure, the information includes flow rate information obtained by the flow rate measurer of the gas meter, and measurement conditions of the flow rate measurer.

A gas meter management system in third disclosure may have a configuration in which, in particular, in the first disclosure, the gas meter includes an abnormality determination unit that determines whether or not gas flow rate has an abnormality based on flow rate information obtained by the flow rate measurer, the information includes abnormality determination information obtained by the abnormality determination unit, and the center device displays the abnormality determination information in the position of the gas meter on the map, the abnormality determination information being obtained from gas meter.

A gas meter management system in fourth disclosure may have a configuration in which, in particular, in the first disclosure, the gas meter includes a shutoff unit that shuts off gas, the information includes shutoff information indicating whether or not the shutoff unit shuts off gas, and the center device displays the shutoff information obtained from the gas meter in the position of the gas meter on the map.

A gas meter management system in fifth disclosure may have a configuration in which, in particular, in the first disclosure, the gas meter includes a seismic intensity measurer that detects seismic intensity, the information includes seismic intensity information obtained by the seismic intensity measurer, and the center device displays the seismic intensity information obtained from the gas meter in the position of the gas meter on the map.

A gas meter management system in sixth disclosure may have a configuration in which, in particular, in any one of the first disclosure to the fifth disclosure, the center device extracts, based on the information, one or more gas meters each determined as having an abnormality among the gas meters, and determines and displays an optimal order of the one or more gas meters as a route on the map.

A gas meter management system in seventh disclosure may have a configuration in which, in particular, in the second disclosure, the center device extracts one or more gas meters installed in a specified region among the gas meters based on the positional information of each of the gas meters, and compares the measurement conditions of the flow rate measurers of the one or more gas meters, the measurement conditions having been obtained from the information, so as to determine whether or not each of the one or more gas meters has a failure, and displays on the map a position of at least one gas meter that has been determined to have the failure among the one or more gas.

By comparing measurement conditions of a plurality of gas meters that is located in a region specified by the positional information of the gas meter, a gas meter that has a failure in the flow rate measurer or an abnormality in a pipe that supplies gas can be specified.

INDUSTRIAL APPLICABILITY

As described above, a gas appliance monitoring system according to the present invention enables various types of analysis to be performed by using flow rate data measured by a gas meter. Therefore, the gas appliance monitoring system according to the present invention is not only applicable to a gas meter for household use, but is also applicable to a gas meter for business use.

REFERENCE MARKS IN THE DRAWINGS

1 gas meter management system
10 gas meter
11 flow rate measurer
14 controller (abnormality determination unit)
18 meter communication unit
20 center device
21 center communication unit
22 data accumulation unit
23 analyzer
24 display

The invention claimed is:

1. A gas meter management system comprising:
   a first gas meter that is installed in a residence, the first gas meter including a flow rate measurer; and
   a center device that collects a plurality of information obtained by the first gas meter, the center device including a display, and the plurality of information obtained by the first gas meter including (i) flow rate information obtained by the flow rate measurer of the first gas meter and (ii) a gain of the flow rate measurer of the first gas meter,
   wherein the center device is configured to manage the plurality of information obtained by the first gas meter and positional information indicating a position of the first gas meter,
   according to an arbitrary selection of an administrator of the center device, the center device is configured to display the positional information of the first gas meter and the plurality of information obtained by the first gas meter together with the position of the first gas meter on a map,
   the center device is configured to display gains of flow rate measurers of a plurality of gas meters installed in a plurality of residences in a region using a common gas pipe, the first gas meter being included in the plurality of gas meters, and the displayed gains of the flow rate measurers of the plurality of gas meters including the gain of the flow rate measurer of the first gas meter,
   the center device is configured to determine an abnormal gas meter from among the plurality of gas meters, the abnormal gas meter being determined based on an abnormal gain from among the gains of the flow rate measurers of the plurality of gas meters, and
   the center device is configured to display a position of the abnormal gas meter.

2. The gas meter management system according to claim 1, wherein
   the first gas meter includes an abnormality determination unit that determines whether or not a gas flow rate has an abnormality based on the flow rate information obtained by the flow rate measurer of the first gas meter, the abnormality determination unit being configured to deliver abnormality determination information when the abnormality determination unit determines that the gas flow rate has the abnormality, and
   the center device is configured to display the abnormality determination information at the position of the first gas meter on the map, the abnormality determination information being obtained from the first gas meter.

3. The gas meter management system according to claim 1, wherein
   the first gas meter includes a shutoff unit that shuts off gas, and the plurality of information obtained by the first gas meter includes shutoff information indicating whether or not the shutoff unit shuts off gas, and
   the center device is configured to display the shutoff information obtained from the first gas meter at the position of the first gas meter on the map.

4. The gas meter management system according to claim 3, wherein
the center device is configured to extract, based on flow rate information obtained from the flow rate measurers of the plurality of gas meters and the gains of the flow rate measurers of the plurality of gas meters, one or more gas meters each determined as having an abnormality from among the plurality of gas meters, and
the center device is configured to determine and display an optimal order of the one or more gas meters as a route on the map.

5. The gas meter management system according to claim 1, wherein
the first gas meter includes a seismic intensity measurer that detects seismic intensity, and the plurality of information obtained by the first gas meter includes seismic intensity information obtained by the seismic intensity measurer, and
the center device is configured to display the seismic intensity information obtained from the first gas meter at the position of the first gas meter on the map.

6. The gas meter management system according to claim 5, wherein
the center device is configured to extract, based on flow rate information obtained from the flow rate measurers of the plurality of gas meters and the gains of the flow rate measurers of the plurality of gas meters, one or more gas meters each determined as having an abnormality from among the plurality of gas meters, and
the center device is configured to determine and display an optimal order of the one or more gas meters as a route on the map.

7. The gas meter management system according to claim 1, wherein
the center device is configured to extract, based on flow rate information obtained from the flow rate measurers of the plurality of gas meters and the gains of the flow rate measurers of the plurality of gas meters, one or more gas meters each determined as having an abnormality from among the plurality of gas meters, and
the center device is configured to determine and display an optimal order of the one or more gas meters as a route on the map.

8. A gas meter management system comprising:
a plurality of gas meters installed in a plurality of residences in a region using a common gas pipe, each of the plurality of gas meters including a flow rate measurer; and
a center device that collects a plurality of information obtained by the plurality of gas meters, the center device including a display, and the plurality of information including (i) flow rate information obtained by the flow rate measurers of the plurality of gas meters and (ii) gains of the flow rate measurers of the plurality of gas meters,
wherein the center device is configured to manage the plurality of information obtained by the plurality of gas meters and positional information indicating a position of the plurality of gas meters,
according to an arbitrary selection of an administrator of the center device, the center device is configured to display the positional information of a specified gas meter from among the plurality of gas meters and the plurality of information obtained by the specified gas meter together with the position of the specified gas meter on a map,
the center device is configured to display the gains of the flow rate measurers of the plurality of gas meters,
the center device is configured to determine an abnormal gas meter from among the plurality of gas meters, the abnormal gas meter being determined based on an abnormal gain from among the gains of the flow rate measurers of the plurality of gas meters, and
the center device is configured to display a position of the abnormal gas meter.

9. The gas meter management system according to claim 8, wherein
the center device is configured to extract, based on plurality of information obtained from the plurality of gas meters, one or more gas meters each determined as having an abnormality from among the plurality of gas meters, and
the center device is configured to determine and display an optimal order of the one or more gas meters as a route on the map.

* * * * *